Sept. 19, 1961  D. T. ZENTMYER  3,000,754
PLASTIC SURFACE COVERING HAVING EMBOSSED
APPEARANCE AND METHOD OF MAKING SAME
Filed Jan. 22, 1959
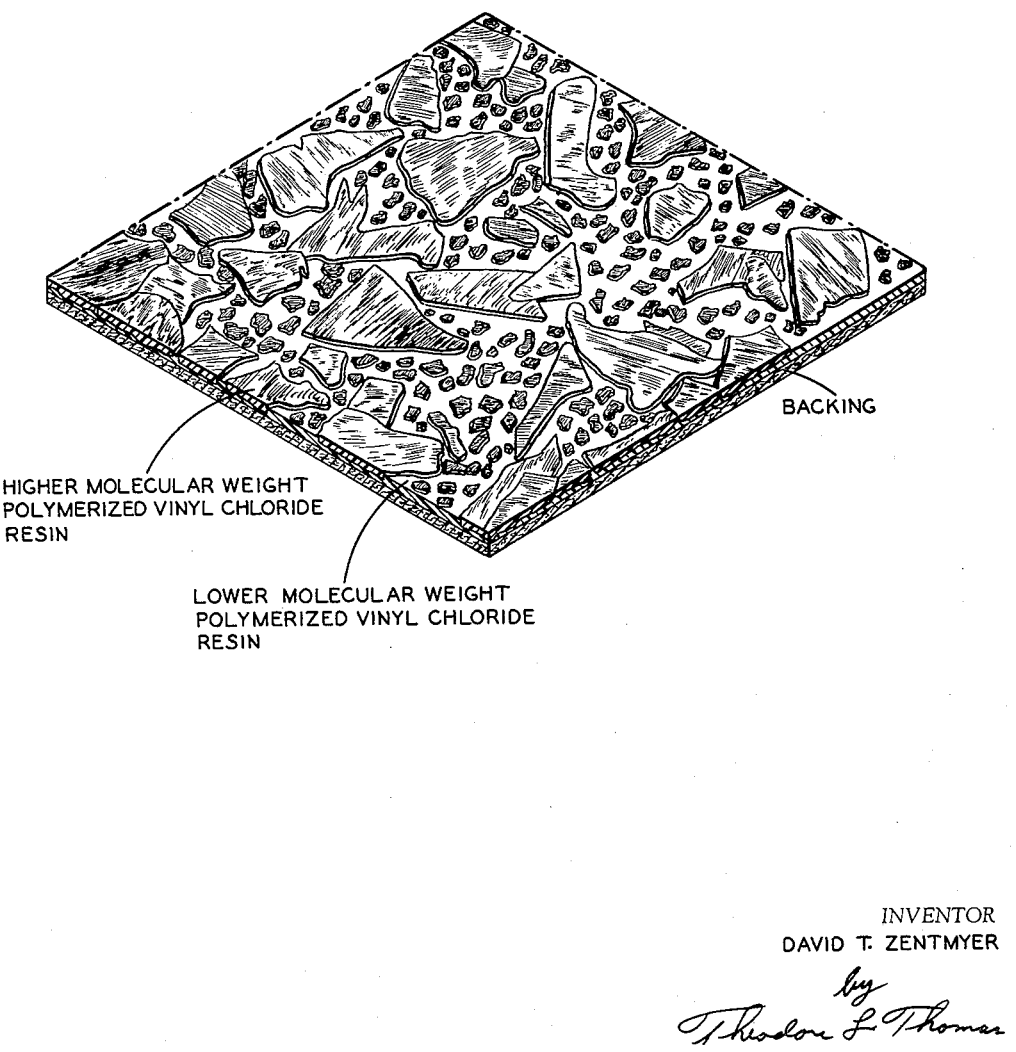
BACKING
HIGHER MOLECULAR WEIGHT
POLYMERIZED VINYL CHLORIDE
RESIN
LOWER MOLECULAR WEIGHT
POLYMERIZED VINYL CHLORIDE
RESIN
*INVENTOR*
DAVID T. ZENTMYER
*by*
Theodore L. Thomas
ATTORNEY

United States Patent Office 3,000,754
Patented Sept. 19, 1961

3,000,754
PLASTIC SURFACE COVERING HAVING EMBOSSED APPEARANCE AND METHOD OF MAKING SAME
David T. Zentmyer, Lancaster Township, Lancaster County, Pa., assignor to Armstrong Cork Company, Lancaster, Pa., a corporation of Pennsylvania
Filed Jan. 22, 1959, Ser. No. 788,272
13 Claims. (Cl. 117—21)

This invention relates generally to surface covering materials, and more particularly to surface covering materials having a synthetic thermoplastic resin wearing surface. Still more particularly, the invention relates to surface covering materials wherein the thermoplastic resinous wearing surface presents an embossed appearance to the eye. The invention also relates to a method of making a surface covering material having an embossed appearance wherein such appearance is accomplished by virtue of the particular materials used and not by any of the normal embossing steps.

Floor coverings are selected by the consumer largely on the basis of durability and beauty. Accordingly, decorative patterns and designs are of prime importance in the manufacture of surface covering materials such as floor coverings, wall coverings, and the like. There is always a need for surface covering materials which present a striking and unusual effect to the eye, while at the same time possessing the requisite stringent physical properties.

It is the primary object of the present invention to supply such a surface covering material and the method of making it. It is a further object to supply a surface covering material which presents an embossed appearance without the need for the normal embossing procedures.

These objects have been accomplished in a straightforward and effective manner. The invention contemplates a surface covering material comprising in combination a backing and a decorative wearing surface affixed to the backing. The wearing surface comprises a polymerized vinyl chloride resin, which resin may be a straight polyvinyl chloride, a vinyl chloride-vinyl acetate copolymer, a vinyl chloride-vinylidene chloride copolymer, or mixtures thereof. The specific viscosity of all the resins used in the wearing surface must be in the range of 0.1–0.6. At least 5% by weight of the resins in the wearing surface must have a specific viscosity different from the specific viscosity of the balance of the resins by at least 0.12.

The drawing illustrates one modification of the surface covering of the present invention.

The synthetic thermoplastic resins to be used in the present invention are those polymerized vinyl chloride resins available in commerce. Exemplary of these resins are the polyvinyl chlorides, vinyl chloride-vinylidene chloride copolymers containing generally 1–20% by weight vinylidene chloride, and the vinyl chloride-vinyl acetate copolymers containing generally up to about 13% by weigth vinyl acetate. When the vinyl chloride-vinylidene chloride copolymers are used, they will most generally be intimately admixed with straight polyvinyl chlorides. These resins are capable of yielding a hard, tough, yet sufficiently flexible wearing surface when treated by the normal surface covering manufacturing processes.

Vinyl chloride polymers having too high a molecular weight are insufficiently processable. At the same time the molecular weight must not be too low if the requisite wearing properties are to be sufficient. The most convenient way to designate the molecular weight range of usable polymerized vinyl chloride resins is by means of the specific viscosity. The specific viscosity of these resins is a convenient means of expressing the molecular weights of the various resins. The lower the specific viscosity, the lower the molecular weight of the resin. Where, as above, it is stated that the limits of the specific viscosity of usable resins are in the range 0.1–0.6, it is really the range of usable molecular weights that is being defined.

The specific viscosity contemplated for use in the present invention is that described in ASTM D–1243–54. Briefly stated this procedure involves dissolving 0.4 gram of the resin to be tested in 100 milliliters of nitrobenzene, followed by heating to 100° C. for one hour to insure thorough solvation. The solution is then run through a viscometer—a capillary tube—and the time is measured for a fixed volume to flow through the viscometer at 30° C. A factor is applied to this time to yield the specific viscosity. Thus it can be seen that the specific viscosity contemplated for use herein as determined by the ASTM D–1243–54 method is a dimensionless number based on the viscosity of nitrobenzene.

The present invention turns on the use of two or more polymerized vinyl chloride resins in which the different resins possess a sufficient spread of molecular weights to result in an embossed appearance of the product solely by virtue of the differing stress relaxation characteristics of the resins. The higher molecular weight resins have a greater tendency to relax vertically (in a direction normal to the plane of a surface covering) than have the lower molecular weight resins after hot pressing. Thus, with properly chosen resins, it is possible to process the resins in normal surface covering processes, and arrive at any desired embossed design or embossed pattern without the need for the usual embossing equipment. The particles of the higher molecular weight resin in the surface covering will be elevated above the particles of the lower molecular weight resin to achieve a characteristic embossed appearance.

It has been found that the specific viscosity of the separate resins must vary by at least 0.12 unit if the embossed appearance is to be visible to the eye. Use of different resins with specific viscosities varying less than 0.12 will not produce the desired embossed effect. At the same time all the resins used in the surface covering material must have specific viscosities falling within the above-stated range of 0.1–0.6. Thus the requisite specific viscosities are completely defined.

As stated earlier, when these thermoplastic resin particles are hot pressed, they have a tendency to recover when the pressure is released. Particles of a higher molecular weight resin will recover more readily than those of a lower molecular weight resin at the elevated temperatures used during pressing. For example, if the particles are pressed at, say, 350° F. against a metal or release paper surface, cooled to, say, 200° F. before removal of the pressure, the higher molecular weight particles will recover vertically more than the lower molecular weight particles. If the particles in contact with the pressing surface had been cooled to room temperature before removal of the pressure, the particles would have been restrained from recovery, and the surface would be flat.

It has also been found that at least about 5% by weight of the total resins must have the different specific viscosity if the resulting product is to present a pleasing appearance. This merely means that at least 5% by weight of the resinous composition must have an elevation different from that of the balance of the composition if the embossed appearance is to appear anything but haphazard. Very small proportions of elevated or depressed surface areas in the surface covering itself are not desirable; greater proportions of the elevated or lowered areas are necessary to establish a design or pattern.

The above-described resins are preferably plasticized before being used in the manufacture of surface coverings. The preferred plasticizer is dioctyl phthalate, but other plasticizers such as butyl octyl phthalate, butyl benzyl phthalate, and many other of the usual plasticizers are suitable. The range of plasticizers will generally vary between about 15%–30% by weight plasticizer based on the weight of the resin. For most purposes in surface covering materials about 20% by weight plasticizer will be used.

The plasticizer is incorporated into the resin by means known in the art. The resin is placed in a Banbury mixer or on a mill, and the plasticizer is simply added thereto. Depending upon the particular resin and plasticizer used, the blending will generally be carried out at a temperature in the range of about 260°–330° F.

The resin-plasticizer blend should preferably contain a stabilizer to minimize degradation of the polymerized vinyl chloride resin by heat and light. Examples of suitable stabilizer are the organo-tin-sulfur complexes sold under the name Advance 17M, Thermolite 31, and the organo-tin compounds sold under the name Thermolite 99. Additionally the cadmium soaps, such as cadmium octylate sold under the name "V-122," barium soaps, and the barium-cadmium soaps may be used as stabilizers. The stabilizers are generally incorporated in the blend in an amount of about 0.1%–1% by weight based on the weight of the polymerized vinyl chloride resin.

Certain compositions may be used in the resin-plasticizer blend to serve a dual role as additional plasticizer and additional stabilizer. Exemplary of such compounds are the epoxidized fatty acids derived from drying and semidrying oils. These are illustrated by the epoxidized soya bean fatty acid mixture sold under the name Paraplex G-62. It is not essential that the resinous blend useful in the present invention contain such compounds; the basic resin-plasticizer-stabilizer mix is preeminently suitable. However, cost and certain processing considerations may sometimes dictate the usefulness of these epoxy plasticizers, particularly where a cadmium soap is used as the stabilizer.

Dyes or pigments can be incorporated into the mix in amounts sufficient to color the particles in any desired manner. The amount of dye or pigment will generally be less than about 8% by weight of the total mix and most generally will be less than about 1% by weight. It will be appreciated that the amount of pigment or dye to be added will be largely dependent on the nature of the pigment or dye.

Fillers, or mixtures of fillers, will frequently be used. These are all mineral, inorganic fillers such as ground limestone, silica, the clays, asbestos, and the like. The filler is incorporated simply by adding it to the resin in the Banbury or on the mill. Generally the amount of filler will vary between about 10%–80% by weight of the total composition. The addition of the filler will generally call for an increase in the amount of plasticizer added to the composition. Also use of filler has been found to retard the stress relaxation property of the polymerized vinyl chloride resins. Thus if a larger amount of filler is to be used in preparing the resin particles, the embossed effect on the final product will be enhanced by utilizing resins having a specific viscosity difference greater than the stated minimum of 0.12.

Once the resin-plasticizer-stabilizer mixture is well blended, it is then sheeted out on a mill. After cooling, the sheet is then passed through a dicing or cutting machine, or other device suitable for forming particles from the sheet. The type of particle to be formed will depend on the pattern or design desired in the final product. Thus the cooled sheet may be granulated or it may be diced into small or large squares. Instead of squares there may be used triangles, circles, or irregular shapes. In copending application Serial No. 779,107, filed December 9, 1958, there is described the method of producing a tessellated surface covering wherein the decorative wearing surface of a surface covering material comprises chips embedded in a mortar. The present invention may be superimposed on the invention described in application Serial No. 779,107 by use of chips, the resin portion of which possesses a specific viscosity at least 0.12 unit higher than the specific viscosity of the mortar. The result of such careful choice of resin properties is that the final product will have an embossed appearance wherein the chips lie at a higher level in a direction normal to the face of the surface covering than does the mortar. The wearing surface of such a product will generally contain 5–10% by weight mortar and 90–95% by weight chips, and preferably 7% by weight mortar and 93% by weight chips.

However, the present invention is not at all limited to the type of process described in copending application Serial No. 779,107. Granular particles of two or more resinous compositions having the requisite specific viscosity differences described above may be blended into a homogeneous mass, laid up on a backing, and fused and pressed to produce a final product having a pebbled appearance. Alternatively, resin particles of one specific viscosity may be deposited on a backing in a design by means of stencils. Additional particles having the requisite different specific viscosity may also be deposited by means of stencils to fill in the areas left by the first stencil. When such an arrangement is heated, fused, and pressed in accordance with normal procedures, the embossed appearance will assume the design laid down by the various stencils. It will be appreciated that a wide variety of designs and patterns are obtainable by the present invention without the need of embossing rolls or presses with the attendant difficulties of matching and spewing.

The particles are to be evenly distributed on the surface of a flexible backing. Suitable backings include burlap, beater saturated felted sheets, felted sheets after-saturated with asphalt or a suitable resin, asbestos sheets, and in short all those flexible backings used in the surface covering industry.

The backing with the layer of resin particles deposited thereon may be passed beneath radiant heaters in order to preheat and soften the thermoplastic resin particles. Preferred modifications is such that the particles are heated to a temperature in the range of about 330°–400° F., with an average temperature throughout the thickness of the layer of particles of about 350° F. It will be appreciated that the temperature and particularly the temperature gradient will depend to some extent on the thickness of the layer of particles. This thickness will generally be in the range of about 0.015″–0.2″.

After being preheated the layers of particles are consolidated with each other and with the backing by passing the backing-particles system through a flat bed press. The press preferably will have a width equal to that of the backing. The press is maintained at a temperature of about 200°–400° F. and preferably about 350° F. and applies a maximum pressure to the system of about 1400 pounds per square inch. Pressing time will vary according to the particular press used, but it has been found that an instantaneous pressure of about 1000 pounds per square inch at a temperature of 350° F. accomplishes the necessary consolidation of the particles and the backing. Pressures are most usually in the range of 800–1400 pounds per square inch. To prevent the surface of the fused particle layer from adhering to the press platen, it is often necessary that a suitable release paper be interposed between the fused polymerized vinyl chloride resin and the surface of the press. As the system passes out of the press, the stress relaxation property of the higher molecular weight resin asserts itself and those particles of the resin will rise to a higher elevation than the lower molecular weight particles; as explained earlier, this is the source of the embossed appearance. Pressing temperatures will always be lower than the temperatures of complete relaxation of the particles. The final cooled sheet may be trimmed and disposed into rolls ready for the market.

Alternatively, the particles may be consolidated onto the backing by means of a calender, or a sheet may be formed by calendering and then laminated to the backing with or without the aid of an adhesive. Where the pattern calls for use of large, flat chips to be pressed directly onto the backing, it is sometimes advisable to first coat the backing sheet with an adhesive in accordance with known procedures.

The following examples illustrate several embodiments of the invention. All parts are by weight unless otherwise stated. All specific viscosities were determined by the method of ASTM D-1243-54.

Example 1

Four resin-plasticizer-stabilizer-filler compositions were prepared which were identical in all respects save for a differing specific viscosity of the vinyl chloride-vinyl acetate copolymers used; the resins also differed in the amount of vinyl acetate present. The resin designation and the specific viscosity are as follows:

| Resin designation: | Specific viscosity |
| --- | --- |
| A | 0.217 |
| B | 0.349 |
| C | 0.462 |
| D | 0.423 |

Each of the compositions was formed into granules measuring approximately ⅛". Various two-part mixtures were made up, each containing 50% by weight of two of the above-described compositions. The mixtures were then spread in a thin layer on an asbestos backing sheet and consolidated at a temperature of 350° F. and an instantaneous pressure of 1400 pounds per square inch. On cooling, the various sheets were examined to determine the extent of the pebbled or embossed effect.

The A—B mixture showed a distinct pebbled or embossed effect; the specific viscosity difference here is 0.132.

The B—C mixture showed no pebbled effect, but only a slight graininess; the specific viscosity difference here is 0.113.

The C—D mixture showed even less graininess and no embossed effect; the specific viscosity difference here is 0.039.

The A—D mixture showed a pronounced pebbled and embossed effect; the specific viscosity difference here is 0.206.

The A—C mixture showed the most pronounced pebbled and embossed effect of all; the specific viscosity difference here is 0.245.

A fifth resin-plasticizer-stabilizer-filler composition was prepared as above using as the resin an intimate mixture containing 80% by weight polyvinyl chloride and 20% by weight of a vinyl chloride-vinylidene chloride copolymer containing about 3–7% by weight vinylidene chloride. The specific viscosity of this resin was 0.33. A fifty-fifty mixture of the composition containing this resin with the A through C compositions described above produced the embossed effect only when mixed with the C composition; the specific viscosity difference with the C composition is 0.13.

Example 2

The following composition was mixed in a Banbury, sheeted off on a mill, and cut into chips measuring approximately ¼" x ¼" x 0.070".

| Ingredients: | Parts |
| --- | --- |
| Vinyl chloride-vinyl acetate copolymer, 2–3% vinyl acetate, specific viscosity 0.423 | 29.16 |
| Dioctyl phthalate | 9.27 |
| Epoxidized soya bean oil (Paraplex G–62) | 1.30 |
| Barium-cadmium soap system, stabilizer (Ferro 1825) | 0.91 |
| Ground limestone filler | 57.80 |
| Pigment | 1.56 |

A mortar or matrix was mixed on the mill, sheeted off, cooled, and ground to a fine powder of a size less than 20 mesh American Standard. Following is the formula:

| Ingredients: | Parts |
| --- | --- |
| Polyvinyl chloride homopolymer, specific viscosity 0.217 | 74.58 |
| Dioctyl phthalate | 19.13 |
| Epoxidized soya bean oil (Paraplex G–62) | 3.95 |
| Stabilizer (Ferro 1825) | 2.33 |
| Pigment | 0.01 |

The chips were spread out on a beater saturated asbestos sheet coated with an acrylic adhesive. The sheet with the chips laid thereon is heated to about 350° F. and passed through a roll system to apply a pressure of about 10–100 pounds per lineal inch to fix the chips to the backing.

The mortar or matrix is subsequently spread over the face of the chip-carrying sheet and brushed so as to fill all the voids. After removing excess matrix, the sheet is heated to about 300° F. and pressed in a flat bed press wherein the top platen is heated to 350° F. An instantaneous pressure of 1000 pounds per square inch is used on top of a press release paper. After the system leaves the press and the release paper is stripped off, the product is found to be an excellent floor covering possessing a pebbled appearance in that the areas between the chips are lower than the top level of the chips by about 0.003–0.01".

In a run made wherein a resin having the same specific viscosity is used for both the mortar and the chips, the resulting product possesses a face which is smooth and glass-like and has no embossed characteristic whatsoever.

I claim:

1. A surface covering material having an embossed appearance comprising in combination a backing and a decorative wearing surface affixed to said backing, said wearing surface comprising separate, fused granules of at least two polymerized vinyl chloride resins having a specific viscosity in the range of 0.1–0.6, at least 5% by weight of said separate granules having a specific viscosity different from the specific viscosity of the balance of said granules by at least 0.12.

2. A surface covering material according to claim 1 wherein said polymerized vinyl chloride resins comprise polyvinyl chloride.

3. A surface covering material according to claim 1 wherein said polymerized vinyl chloride resins comprise a vinyl chloride-vinyl acetate copolymer.

4. A surface covering material according to claim 3 wherein said vinyl chloride-vinyl acetate copolymer comprises a mixture of copolymers having differing amounts of vinyl acetate therein.

5. A surface covering material according to claim 1 wherein said polymerized vinyl chloride resins comprise a vinyl chloride-vinylidene chloride copolymer.

6. A surface covering material according to claim 1 wherein said polymerized vinyl chloride resins comprise a mixture of polyvinyl chloride and vinyl chloride-vinyl acetate copolymer.

7. A surface covering material according to claim 1 wherein about 5–10% by weight of said granules have a specific viscosity different from the specific viscosity of the remaining 90–95% by weight of said granules by at least 0.12.

8. The method of forming a surface covering material having an embossed appearance which comprises depositing separate granules of at least two polymerized vinyl chloride resins onto a backing, at least about 5% by weight of the total weight of said separate granules having a specific viscosity different from the specific viscosity of the balance of said granules by at least 0.12, and subjecting said backed granules to heat and pressure whereby said granules fuse together to form a coherent decorative wearing surface affixed to said backing, said wearing surface having an embossed appearance.

9. The method according to claim 8 wherein said polymerized vinyl chloride resins comprise polyvinyl chloride.

10. The method according to claim 8 wherein said polymerized vinyl chloride resins comprise a vinyl chloride-vinyl acetate copolymer.

11. The method according to claim 10 wherein said vinyl chloride-vinyl acetate copolymer having different specific viscosities possesses different amounts of vinyl acetate.

12. The method according to claim 8 wherein said polymerized vinyl chloride resins comprise polyvinyl chloride plus vinyl chloride-vinyl acetate copolymer.

13. The method according to claim 8 wherein said polymerized resins comprise a vinyl chloride-vinylidene chloride copolymer.

References Cited in the file of this patent

UNITED STATES PATENTS

| | | |
|---|---|---|
| 2,396,125 | Price | Mar. 5, 1946 |
| 2,444,094 | Duggan | June 29, 1948 |
| 2,557,025 | Brand | June 12, 1951 |
| 2,618,020 | Busse et al. | Nov. 18, 1952 |
| 2,646,374 | Gillespi | July 21, 1953 |
| 2,646,414 | Gillespi | July 21, 1953 |
| 2,677,622 | Schouteden | May 4, 1954 |
| 2,835,620 | Bartlett | May 20, 1958 |